US007459653B2

(12) United States Patent
Steiner et al.

(10) Patent No.: US 7,459,653 B2
(45) Date of Patent: Dec. 2, 2008

(54) DEVICE FOR COMPACTING AND/OR WELDING ELECTRIC CONDUCTORS

(75) Inventors: Christian Steiner, Heuchelheim (DE); Ernst Steiner, Heuchelheim (DE)

(73) Assignee: Schunk Ultraschalltechnik GmbH, Wettenberg (DE)

( * ) Notice: Subject to any disclaimer, the term of this patent is extended or adjusted under 35 U.S.C. 154(b) by 483 days.

(21) Appl. No.: 10/568,774

(22) PCT Filed: Aug. 23, 2004

(86) PCT No.: PCT/EP2004/009404

§ 371 (c)(1),
(2), (4) Date: Apr. 5, 2006

(87) PCT Pub. No.: WO2005/021203

PCT Pub. Date: Mar. 10, 2005

(65) Prior Publication Data

US 2007/0000890 A1   Jan. 4, 2007

(30) Foreign Application Priority Data

Aug. 22, 2003  (DE) ............................ 103 39 097
Sep. 12, 2003  (DE) ............................ 103 42 534

(51) Int. Cl.
*B23K 1/00*  (2006.01)
*B23K 1/06*  (2006.01)
(52) U.S. Cl. ............................ 219/56; 228/110.1
(58) Field of Classification Search .............. 219/56, 219/56.1, 56.21, 56.22, 57, 58; 228/110.1, 228/111, 1.1

See application file for complete search history.

(56) References Cited

U.S. PATENT DOCUMENTS

| 6,079,608 A | 6/2000 | Steiner et al. |
| 6,299,052 B1 * | 10/2001 | Wnek et al. ............... 228/110.1 |
| 6,393,924 B1 | 5/2002 | Eder et al. |
| 2004/0178249 A1 * | 9/2004 | Gordon .................... 228/110.1 |
| 2006/0283912 A1 * | 12/2006 | Eberach ...................... 228/101 |

FOREIGN PATENT DOCUMENTS

| DE | 4129633 | 7/1992 |
| EP | 0517040 | 12/1992 |
| WO | 9510866 | 4/1995 |
| WO | 03066270 | 8/2003 |

* cited by examiner

*Primary Examiner*—Sang Y Paik
(74) *Attorney, Agent, or Firm*—Dennison, Schultz & MacDonald

(57) ABSTRACT

A device for compacting and/or welding electric conductors (10), in particular for producing via nodes or end nodes of stranded conductors. The device includes a first electrode, one section of which constitutes a first delimitation surface of a compacting chamber that receives the conductor, the chamber in addition being delimited by one section of a counter-electrode that forms a second delimitation surface and by at least one additional third delimitation surface that is formed by a section of a delimitation element. The inventions simplifies the construction of the device, enabling repeated compacting and welding of conductors. To achieve this, a compacting chamber has a substantially triangular open cross-section, which is surrounded by the sections of the first electrode and the counter-electrode, these sections being adjustable in relation to one another, and by the delimitation element.

12 Claims, 5 Drawing Sheets

DEVICE FOR COMPACTING AND/OR WELDING ELECTRIC CONDUCTORS

This application is a filing under 35 USC 371 of PCT/EP2004/009404, filed Aug. 23, 2004.

The invention relates to a device for compacting and/or welding electric conductors, particularly for producing via nodes or end nodes of stranded conductors, said device comprising a first electrode, a portion of which constitutes a first delimitation surface of a compacting chamber that receives the conductors, said chamber in addition being delimited by one portion of a counter-electrode that forms a second delimitation surface, for instance an anvil, and by at least one additional third delimitation surface that is formed by a delimitation element, whereby the counter-electrode projects from the delimitation element in a displaceable manner.

DE-A-31 51 151 describes an ultrasonic welding device with which conductors can be welded for the first time, without the usual sleeves being needed around the node areas. To that end, the conductors are placed into a compacting chamber which is delimited by a portion of a sonotrode and a portion of a counter-electrode—also called an anvil.

EP-B-0 143 936 describes an ultrasonic welding device in which a compacting chamber is delimited by four elements in order to be able to adjust the chamber, particularly its height and width. To that end, besides the sonotrode and the counter-electrode (i.e. the anvil), two lateral delimiting elements are provided, at least one of which is adjustable, for instance by displacement.

EP-B-0 723 713 describes a method and a device for compacting and then welding electrical conductors, wherein, once the conductors have been compacted, a characteristic quantity of the compacting chamber is measured in order to call up welding parameters that have been stored on the basis of the said quantity.

The joining of conductors using resistance welding or pressure welding is also known.

The problem with which the invention is concerned is that of developing a device of the kind described above in such a way that the advantages of a welding device with a compacting chamber that is adjustable in two mutually perpendicular directions are preserved, while at the same time the construction is simplified.

In order to solve this problem, the invention provides more especially that the compacting chamber has a substantially triangular open cross-section which is surrounded by the mutually adjustable portions of the first electrode, of the delimitation element, and of the counter-electrode, and that when the delimitation element is moved, the counter-electrode is positively driven so that the edge of the counter-electrode adjoining the first electrode is adjustable along the first delimitation surface while a constant or nearly constant gap is maintained during the compacting or welding of the conductors.

Unlike in the prior art, the compacting chamber is surrounded by only three mutually adjustable elements, forming a compact unit. It is also possible for an intermediate element such as an intermediate plate to be provided between the first electrode and the delimitation element that is movable relative thereto.

In order to achieve a triangular cross-section, it is provided that the portion of the first electrode which forms the first delimitation surface forms an angle $\alpha$ with the second delimitation surface that is formed by the counter-electrode, where $\alpha \neq 90°, 0°$, particularly where $30° < \alpha < 60°$, and that the second delimitation surface merges into the first delimitation surface with a gap between them.

According to the invention, the delimitation surfaces of the first electrode and the counter-electrode form an acute angle, wherein the counter-electrode is displaced along the first electrode with a constant or nearly constant gap maintained between them.

In order to realize such displacement by simple constructional means, the counter-electrode can project from the lateral delimitation element, which in practice is vertically displaceable, as is known from ultrasonic welding as described in DE-C-37 19 083 for example. Express reference is hereby made to the respective disclosure contents.

With the reduction of the compacting chamber cross-section, in other words with the moving of the delimitation element along the first electrode, the counter-electrode is simultaneously moved back, driving it positively so that the counter-electrode maintains a constant or nearly constant distance with reference to its edge region adjoining the first delimitation surface formed by the first electrode, the dimensions of which distance correspond to those in the known adjustable compacting chambers. The positive driving can be controlled mechanically or by a motor.

In particular, it is provided that at least one projection protrudes from the counter-electrode, which projection interacts with at least one guide, optionally constructed as a groove or slot, with a curved or linear shape at least in sections. In this case, the positive driving follows a course which, at least in sections, corresponds to the course of the first delimitation surface, the constant or nearly constant gap between the counter-electrode and the first delimitation surface thereby being guaranteed.

According to a further development of the invention, it is provided that the second delimitation surface, which is formed by the counter-electrode, forms an angle $\gamma$ with the third delimitation surface which is formed by the delimitation element, where $\gamma = 90°$ or $\gamma > 90°$.

In particular, the direction of motion of the counter-electrode relative to that of the delimitation element is chosen so that the two form an obtuse angle relative to the compacting chamber, thereby ensuring slight mobility of the counter-electrode. The obtuse angle can be between 91° and 93° for example.

The first electrode can be a sonotrode of an ultrasonic welding device. But it is also possible to use the teaching of the invention in conjunction with resistance welding or pressure welding. Consequently, the first electrode and the counter-electrode can be electrodes of a resistance welding device. In this case the delimitation element can consist of electrically isolating material. Alternatively, an electrically isolating gap can run between the delimitation element and the first electrode.

In so far as the invention concerns an ultrasonic device, a particularly important aspect of the invention provides that all delimitation surfaces be structured so that when a node is formed it too has full peripheral structuring.

Furthermore, in order to achieve the desired geometry of the node that is to be formed, the first delimitation surface can have a concave course, at least in sections, relative to the compacting chamber. The guides for the positive driving of the counter-electrode must then have a congruent geometry.

In order to achieve a first electrode or a sonotrode with a long service life, it is provided that the first electrode or the sonotrode comprise a plurality of first delimitation surfaces, wherein the region of the first electrode or sonotrode comprising the delimitation surfaces has a polygonal cross-section, for instance an octagonal one. This results in optimal usage of the first electrode or respectively sonotrode.

It is further provided that the counter-electrode be positively driven in such a way that it runs externally of the compacting chamber when the conductors are placed into the chamber. This results in a simplification of conductor insertion, since the counter-electrode does not create an obstacle. This complete retraction of the counter-electrode from the compacting chamber can also be accomplished by means of the positive driving.

In order to prevent a node from having sharp edges when formed, another important development of the invention provides that the edge of the first electrode adjoining the delimitation element and/or the edge of the delimitation element adjoining the counter-electrode and/or the edge of the counter-electrode adjoining the first electrode be shaped in such a way that the cross-section of the compacting chamber has a corner or corners which is or are rounded in a corresponding fashion.

The invention is further characterized by a method for compacting and welding electric conductors such as stranded conductors according to which the conductors are placed in a compacting chamber which is adjustable in two mutually intersecting directions for the purposes of adjusting the cross-section, and the conductors are initially compacted by reducing the cross-section, following which a characteristic quantity of the compacting chamber is determined, welding parameters are retrieved from a memory on the basis of said quantity, and the conductors are then welded accordingly. In this case, a chamber with a substantially triangular cross-section which forms a through opening for the conductors and which has three delimitation surfaces is used as the compacting chamber, and during the welding each of the delimitation surfaces which acts on the conductors is reduced. The length of a delimitation surface perpendicular to the through opening of the compacting chamber can be chosen as the characteristic quantity.

By these means, a defined welding process can be carried out regardless of the conductor cross-section; furthermore, it is possible to weld conductors with different cross-sections in succession in any order. The teaching of the invention makes possible a self-regulating welding process which is initiated by a defined compacting of the conductors about to be welded, at the end of which the compacting chamber has a predefined height-width ratio regardless of the cross-sections of the conductors about to be welded. Of course, some other compacting chamber measurement can also be chosen instead of the height to width ratio, for instance the length of a delimitation surface perpendicular to the conductor's longitudinal axis. After preliminary compaction and after the calculation of the characteristic quantity, the welding parameters which are associated with the characteristic value, such as welding energy, amplitude, time and/or pressure, must then be retrieved and applied.

Further details, advantages and features of the invention derive not only from the claims, that is to say from the features which, alone or in combination, derive from the claims, but also from the preferred exemplified embodiments that emerge from the following description of the drawing.

Shown are:

Figure 1:
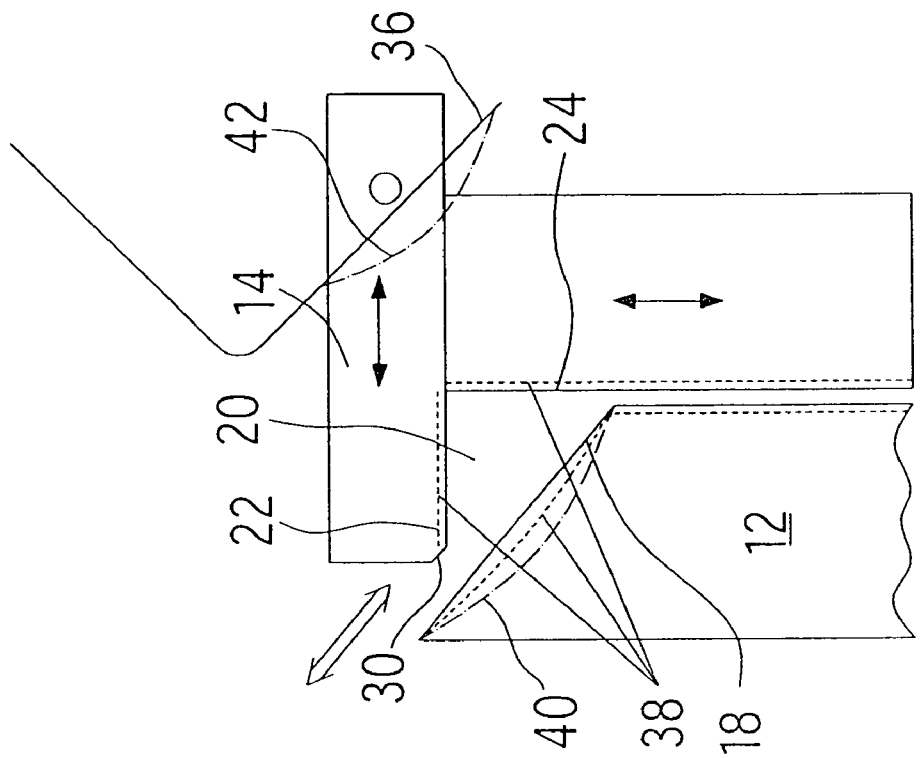
FIG. 1 is a schematic representation of a first specific embodiment of a compacting chamber of an ultrasonic welding device.

The Figures represent in an elementary manner electrode configurations of ultrasonic welding devices (FIG. 1 to 7) and resistance welding and pressure welding devices (FIGS. 8 and 9) with which electrical conductors such as stranded conductors can be compacted and welded in order to produce, for example, via nodes or end nodes. The compacting chambers according to FIGS. 1 to 7, in this case, are delimited by elements of an ultrasound welding device in the manner made known, for example, in EP-B-0 723 713 or DE-A-37 19 083. The respective embodiments are hereby expressly referenced, particularly in relation to the function of an ultrasonic welding device.

In order to guarantee the optimal compacting or respectively welding of conductors 10 regardless of their cross-section, the respective compacting chamber must be adjustable to the cross-section of the conductors 10 or respectively to the number of the conductors 10. It was first proposed in DE-A-33 35 254 that a compacting chamber be constructed so that it is adjustable in two mutually perpendicular directions.

Whereas in the prior art four elements are required in order to be able to adjust a compacting chamber accordingly, with the invention only three elements are required, which are formed by portions of a sonotrode 12 that generates ultrasonic oscillations, of a counter-electrode—hereinafter anvil 14—and of a lateral delimitation element 16.

The sonotrode 12, in this case, forms a first delimitation surface 18 of a compacting chamber 20. A second delimitation surface 22 is provided by the anvil 14, which protrudes in a displaceable manner from the delimitation element 16, which itself provides a third delimitation surface 24.

The anvil 14 and the delimitation element 16, in this case, are interconnected in the usual manner; the anvil 14 is adjustable perpendicular to the direction of displacement (arrow 26) of the delimitation element 16 according to the exemplified embodiments in FIGS. 1, 2, 3, 5 and 7, in other words in a manner known, for example, from DE-A-37 19 083. The direction of movement of the anvil 14 is referenced 28 in FIG. 1.

As is apparent from the view represented in FIG. 1, the delimitation surface 18 of the sonotrode 12 extends at an angle relative to the delimitation surfaces 22, 24 of the anvil 14 and of the delimitation element 16. Thus the compacting chamber 20 has a triangular open cross-section. In this context triangular also encompasses different geometries such as trapezoidal shapes. An apex of the triangle is formed by the bottom, i.e. the bottom region, of the compacting chamber 20.

The delimitation surface 18 of the sonotrode 12 forms an angle α relative to the delimitation surface 22 of the anvil 14, where α is preferably between 30° and 60°. An angle β between 60° and 30° exists between the sonotrode delimitation surface 18 and the delimitation surface 24 of the delimitation element 16. In the exemplified embodiment of FIG. 1, the delimitation surface 22 of the anvil 14 forms a right angle with the delimitation surface 24 of the delimitation element 16.

In order for a constant distance to be maintained between the anvil 14, that is to say its transverse edge 30 on the sonotrode side, and the delimitation surface 18 of the sonotrode 12 when the compacting chamber 22 is displaced, in other words during the compacting and welding of the conductors 10, upon the movement of the delimitation element 16 the anvil 14 is positively driven in such a way that the direction of motion (arrow 32) of the transverse edge 30 runs parallel to the delimitation surface 18. The positive driving can be accomplished mechanically or by means of an electromotor. Other technically equivalent solutions are also possible.

As schematically represented in FIG. 1, a projection extends from the anvil 14, which interacts with a guide 36 for the positive driving, optionally a rectilinear projection, a slot, or suchlike.

The guide 36, in this case, extends parallel to the delimitation surface 18 of the sonotrode 12 in the region in which the anvil 14 is displaced with its edge 30 along the delimitation surface 18 during the modification of the cross-section of the compacting chamber 20.

In order to insert conductors 10 into the compacting chamber 20 without difficulty, the delimitation element 16 is lifted. The anvil 14 is thereby retracted completely from the compacting chamber 20 by virtue of the path of the guide 36 as represented by the course of guide 36 in FIG. 1.

Further developments and embodiments of the compacting chamber 20 of the invention are represented in FIGS. 2 to 7, in which equivalent elements are given identical references.

Figure 2:
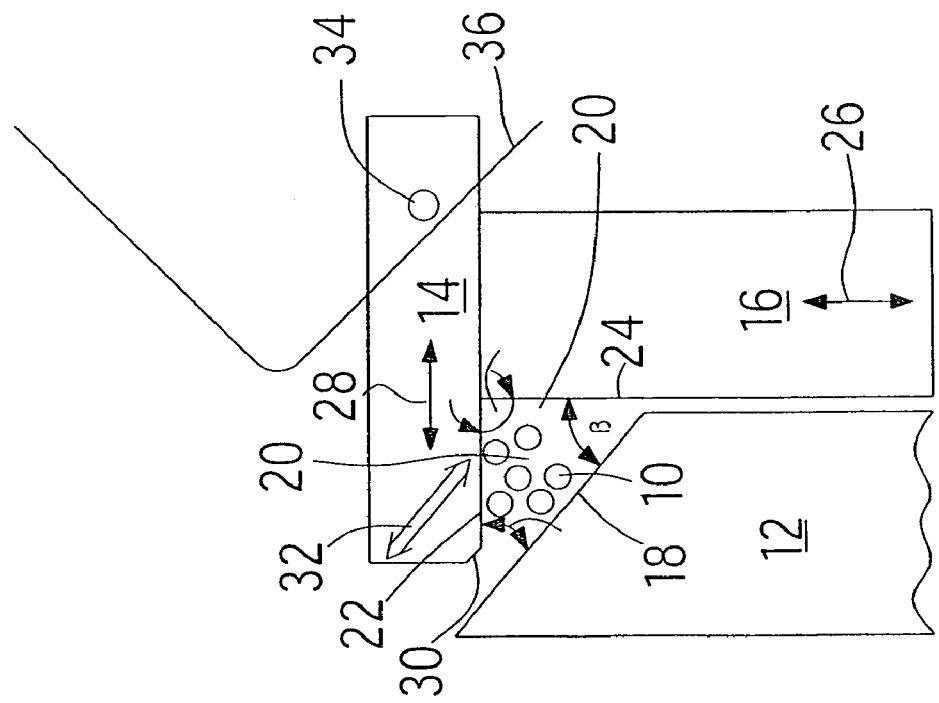
FIG. 2 is a second specific embodiment of a compacting chamber.

In order to structure a node peripherally, according to the exemplified embodiment of FIG. 2 the compacting chamber 28 itself is peripherally structured; i.e., the delimitation surfaces 18, 22, 24 have a structure in the shape of waves, waffles, ribs, or suchlike. The respective structuring is given the reference 38.

A further alternative is for the delimitation surface 18 of the sonotrode 12 to follow a concave course in relation to the compacting chamber 20. This is indicated by the dotted curve 40. In this case, the guide 36 must have a corresponding course (curve 42) in order to guarantee that there is still a constant distance between the anvil 14, that is to say specifically its transverse edge 30 on the sonotrode side, and the course of the delimitation surface symbolized by curve 40.

Figure 3:
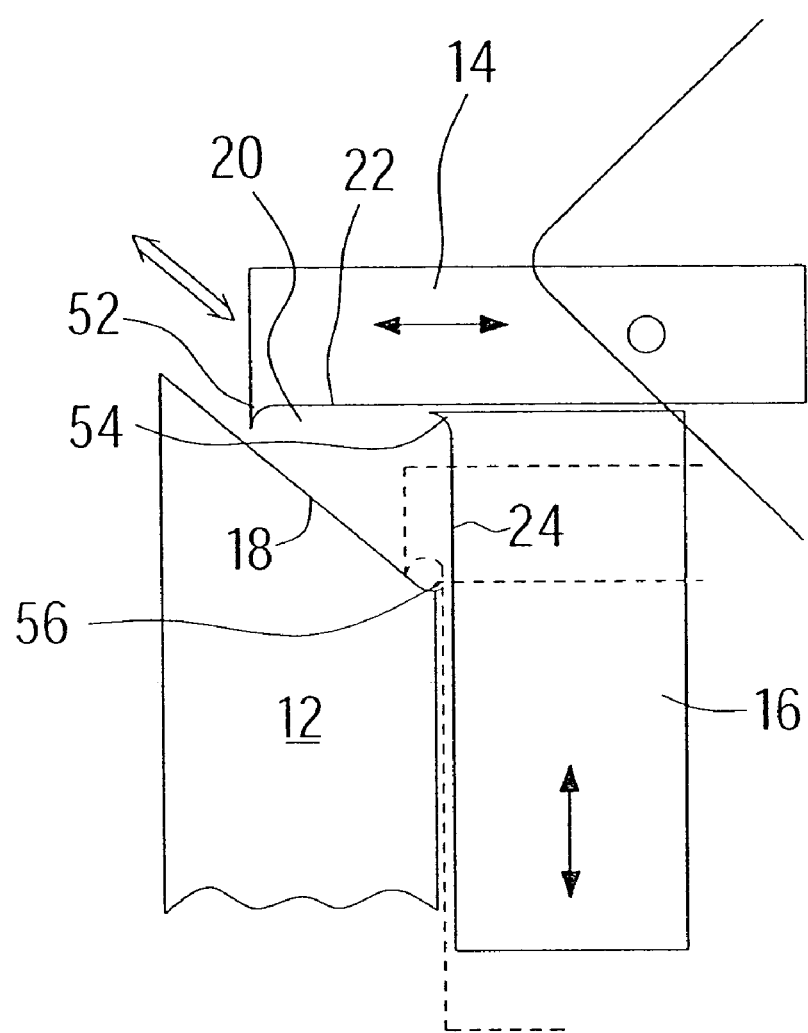
FIG. 3 is a third specific embodiment of a compacting chamber.
Figure 4:
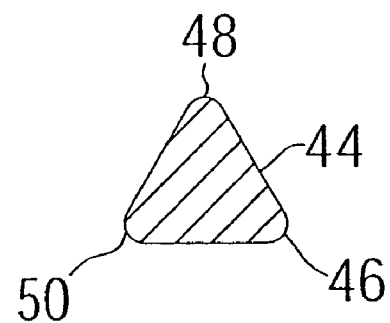
FIG. 4 is a cross-section through a node.

In order to make it possible for a node 44 which is constructed using the device of the invention to have rounded longitudinal edges 46, 48, 50, it is provided according to the exemplified embodiment of FIG. 3 that the edges of the sonotrode 12, the anvil 14 and the delimitation element 16 follow a curved course in the direction of the respective adjoining delimitation surface 18, 22, and 24. The corresponding protruding edge sections are referenced 52, 54, 56 in FIG. 3. By virtue of edge portions 52, 54, 56 the delimitation surfaces 18, 22, 24 follow a concave course relative to the compacting chamber 20 in the corner region.

In other words, the transverse edges 52, 54, 56, which adjoin the corners of the compacting chamber 22, of the delimitation surfaces 18, 22, 24 are constructed as projections extending in the direction of the adjoining delimitation surface 18, 22, 24.

Figure 5:
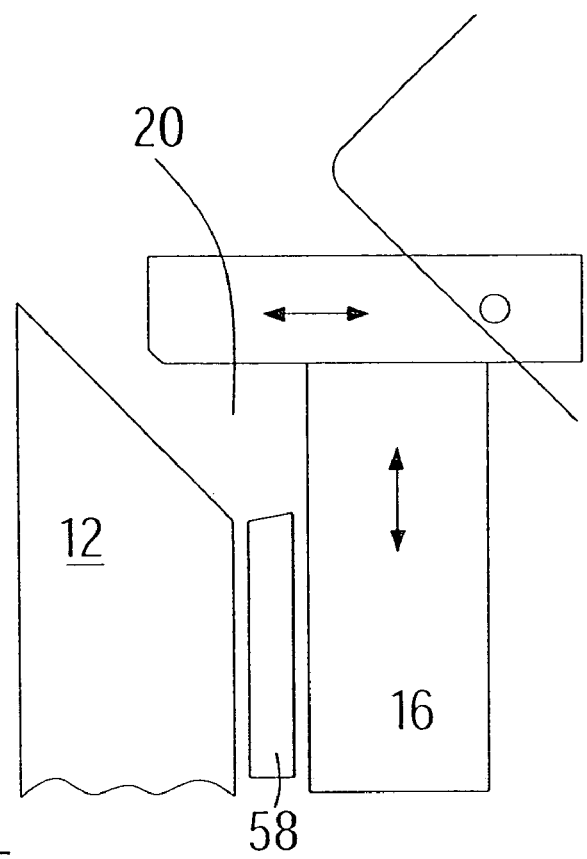
FIG. 5 is a fourth specific embodiment of a compacting chamber.

In the exemplified embodiment of FIG. 5, there is an intermediate element like a plate 58 between the sonotrode 12 and the delimitation element 16, which projects from the device, i.e. which is stationary relative to the compacting chamber 20. The advantage of this is that the corresponding edge region of the welded node 44 that is to be removed from the compacting chamber 20 is flattened.

Figure 6:
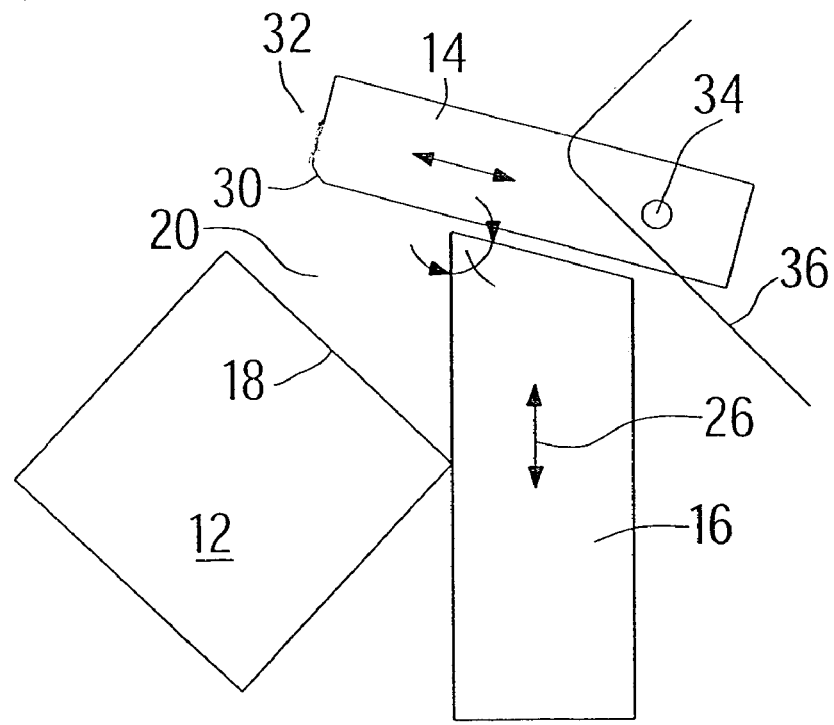
FIG. 6 is a fifth specific embodiment of a compacting chamber.
Figure 7:
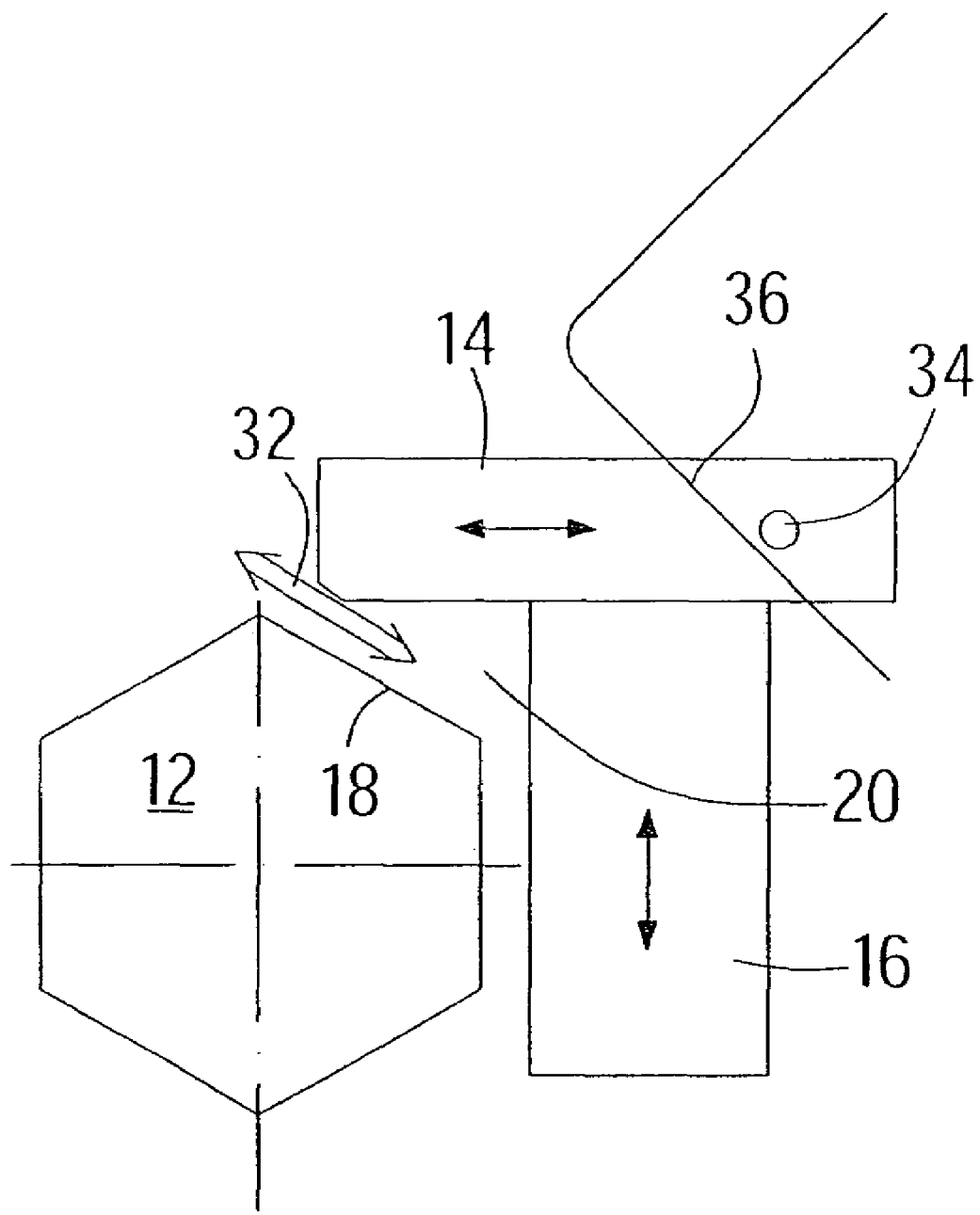
FIG. 7 is a sixth specific embodiment of a compacting chamber.

In order to make possible a frictionless positive driving of the anvil 14, it is provided according to the exemplified embodiment represented in FIG. 6, which is an exaggerated view, that the anvil 14 not be displaceable perpendicular to the displacement path 26 of the delimitation element 16 but that instead it form an angle δ of between 87° and 89°; this does not exceed the scope of the inventive teaching. This brings the advantage that the anvil 14 can be moved with less force when the cross-section of the compacting chamber 20 is reduced. Nevertheless, when the cross-section of the compacting chamber 20 is modified, the transverse edge 30 of the anvil 14 on the sonotrode side is moved parallel to the delimitation surface 18 of the sonotrode 12. This is indicated by the double arrow 32.

As has already been shown schematically in FIG. 6, the sonotrode can comprise a number of delimitation surfaces 18. In order to facilitate optimal use, the sonotrode 12 can be constructed as a polygon, particularly an octagon, in its region comprising the delimitation surfaces 18, as is apparent from FIG. 7.

According to the invention and in distinction to the prior art, the compacting chamber 20 is delimited exclusively by three mutually displaceable and oscillating elements, in the exemplified embodiments the sonotrode 12, the counter-electrode or the anvil 14, and the lateral delimitation element 16. If in accordance with the exemplified embodiment represented in FIG. 5, an intermediate element 58 is also provided, such an embodiment is also embraced by the idea of a compacting chamber 20 being delimited by only three elements so that the compacting chamber is displaceable to the desired degree in two mutually perpendicular directions.

Because the compacting chamber 20 has a triangular geometry, with one corner of the triangle being the deepest point of the compacting chamber 20, the added benefit is created that even a small number of conductors 10 can be compacted and welded without difficulty, since they are arranged more or less on top of one another rather than side by side by virtue of this geometry. This produces a stacking of conductors 10.

Furthermore, all delimitation surfaces 18, 22, 24 can be structured, which is an advantage that does not exist in the known ultrasonic welding devices with adjustable compacting chamber cross-sections.

Another advantage of the triangular geometry of the compacting chamber is that the delimitation surface 18 formed by the sonotrode 12 may have a curved construction, preferably a concave one but also a convex one, instead of being flat in relation to the compacting chamber, since the guide for the positive driving of the anvil 14 guarantees that it maintains a constant or nearly constant gap relative to the delimitation surface 18 when displaced.

Furthermore, it is apparent from FIGS. 1 to 3 and 5 to 7 that the first delimitation surface 18 which is formed by the sonotrode 12 is angled relative to horizontal, specifically by the angle α.

Figure 8:
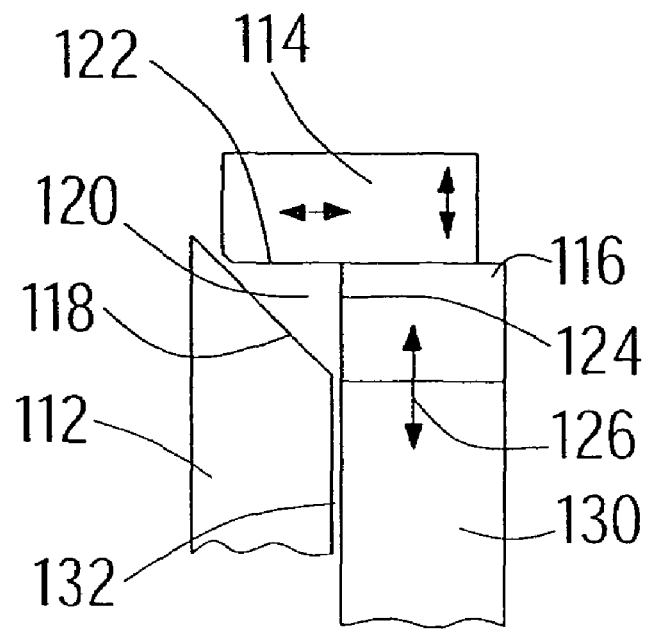
FIG. 8 is a schematic representation of a first specific embodiment of an electrode configuration of a resistance welding device.
Figure 9:
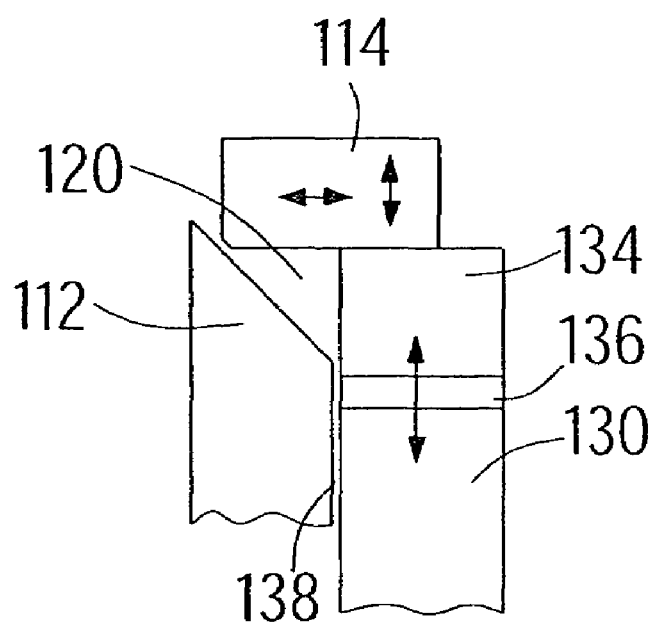
FIG. 9 is a second specific embodiment of an electrode configuration of a resistance welding device.

FIGS. 8 and 9 are schematic representations of electrode configurations of a resistance welding device and a pressure welding device for welding conductors as described in connection with FIGS. 1 to 7. The respective electrodes play corresponding roles in order to form a compacting chamber with a substantially triangular cross-section which is adjustable.

FIG. 8 represents a first electrode 112 corresponding to the sonotrode 12, which has a first delimitation surface 118 extending at an angle to its longitudinal axis. The first electrode 112 is matched with a counter-electrode 114, which projects in a displaceable manner, as represented by the arrows, from an isolator 116 serving as the delimitation element. The second electrode 114 forms a second delimitation surface 122, and the delimitation element or respectively isolator 116, forms a third delimitation surface 124 for a respectively delimited compacting chamber 120. The isolator 116 projects from a carrier 130, which is adjustable in such a way that a gap 132 is maintained relative to the first electrode 112 (see double arrow 126).

According to FIG. 9, the compacting chamber 120, which is identified with the same reference, can also be limited by a total of 3 electrodes, namely the first electrode 112, the second electrode 114, and a third electrode 134 instead of the isolator 116 in FIG. 8 but at the same potential as the second electrode 114. The third electrode 134 is connected to the carrier 130 by way of an isolator 136 in this case, as shown in FIG. 8. An electrically isolating gap 138 also runs between the first electrode 112 and the third electrode 134.

Using such electrode configurations, conductors can be welded by means of resistance welding or pressure welding in order to produce a via node or an end node with a triangular cross-section. Accordingly, in order to prevent sharp edges electrodes 112, 114, 116, 134, or respectively their delimitation surfaces 118, 122, 24 can comprise, in their end regions which delimit the compacting chamber 120, delimitation edges extending in the direction of the compacting chamber 120.

According to FIGS. 8 and 9, the delimitation surface 118 of the stationary electrode 112 runs at an angle to horizontal corresponding to the delimitation surface 18 of the sonotrode 12.

The teaching of the invention also opens up the further possibility of carrying out a self-regulating welding process based on the beneficial aspect of the invention that when a characteristic quantity of the compacting chamber such as height is determined following the compacting of the conductors, the cross-section of the chamber is known immediately, so welding parameters can be fetched from a memory on the basis of the characteristic quantity in order to carry out an optimal welding process. In other words the basic idea of EP-B-0 723 713 is applied but is implemented more simply.

The invention claimed is:

1. Ultrasound welding device for compacting and/or welding electric conductors (10), more especially for producing via nodes or end nodes of stranded conductors, said ultrasound welding device comprising a sonotrode (12), one portion of which is a first delimitation surface (18) of a compacting chamber (20) that accommodates the conductors, said compacting chamber in addition being defined by a portion of a counter-electrode (14) that forms a second delimitation surface (22) and by at least one additional third delimitation surface (24) that is formed by a portion of a delimitation element (16), wherein the compacting chamber (20) has a substantially triangular open cross-section, which is surrounded by the mutually adjustable portions of the sonotrode (12), of the delimitation element (16) and of the counter-electrode (14), and, when the delimitation element is displaced, the counter-electrode is positively driven in such a manner that during the compacting or respectively welding of the conductors (10), the edge (30) of the counter-electrode adjoining the sonotrode is adjustable along the first delimitation surface (18) while a constant or almost constant gap is maintained, characterised in that the first delimitation surface that is formed by the portion of the sonotrode (12) extends inclinedly relative to the horizontal, in that the third delimitation surface (24) that is formed by the delimitation element (16) extends vertically and in that the counter-electrode (14) projects from the delimitation element so as to be displaceable.

2. Ultrasound welding device according to claim 1, characterised in that the first delimitation surface (18) and the third delimitation surface (24) form an angle $\beta$ where $30 < \beta < 60°$.

3. Device according to claim 1, characterised in that the second delimitation surface (22) that is formed by the counter-electrode (14) forms an angle $\gamma$ with the third delimitation surface (24) that is formed by the delimitation element (16), where $\gamma = 90°$ or $\gamma > 90°$.

4. Device according to claim 1, characterised in that the positive driving can be controlled mechanically or by motor, wherein the counter-electrode (14) interacts with a positive driving, the course of which, in at least one portion, corresponds to the course of the first delimitation surface (18).

5. Device according to claim 1, characterised in that all the delimitation surfaces (18, 22, 24) are structured.

6. Device according to claim 1, characterised in that the sonotrode (12) includes a plurality of delimitation surfaces (18).

7. Device according to claim 6, characterised in that in its region comprising the delimitation surfaces (18), the sonotrode (12) has a polygonal cross-section, such as an octagonal cross-section.

8. Device according to claim 1, characterised in that the counter-electrode (14) is positively driven in such a manner that when placing the conductors into the compacting chamber (20), the counter-electrode extends externally of the compacting chamber.

9. Device according to claim 1, characterised in that an intermediate element (58) such as an intermediate plate extends between the sonotrode (12) and the delimitation element (16).

10. Device according to claim 1, characterised in that the edge (56) of the sonotrode (12) adjoining the delimitation element (16) and/or the edge (54) of the delimitation element (16) adjoining the counter-electrode (14) and/or the edge (52) of the counter-electrode adjoining the sonotrode is shaped in such a manner that the cross-section of the compacting chamber (20) includes corners that have been rounded in a corresponding manner.

11. Method for the compacting and subsequent welding of electric conductors such as stranded conductors, wherein the conductors are placed in a compacting chamber, which is adjustable in two mutually intersecting directions for the purposes of adjusting the cross-section and is defined by at least one surface of a sonotrode, one surface of a counter-electrode and one surface of a delimitation element, and the conductors are initially compacted to reduce the cross-section, wherein following the compacting process a characteristic quantity of the compacting chamber is determined and on the basis of the said characteristic quantity, welding parameters stored in a memory are called up and the conductors are then welded accordingly, characterised in that a chamber with a substantially triangular cross-section which forms a through opening for the conductors and which has three delimitation surfaces that are formed by the surfaces of the sonotrode, the counter-electrode and the delimitation element is used as the compacting chamber, wherein the surface of the sonotrode extends in an inclined manner relative to the horizontal and the surface of the delimitation element extends in a vertical manner, in that the conductors are placed into the compacting chamber with the surface of the counter-electrode extending externally of the compacting chamber and in that during the welding process each surface of the sonotrode, the counter-electrode and the delimitation element working on the conductors is reduced.

12. Method according to claim 11, characterised in that the length of a delimitation surface transversely relative to the through opening of the compacting chamber is determined as the characteristic quantity.

\* \* \* \* \*